Patented July 16, 1929.

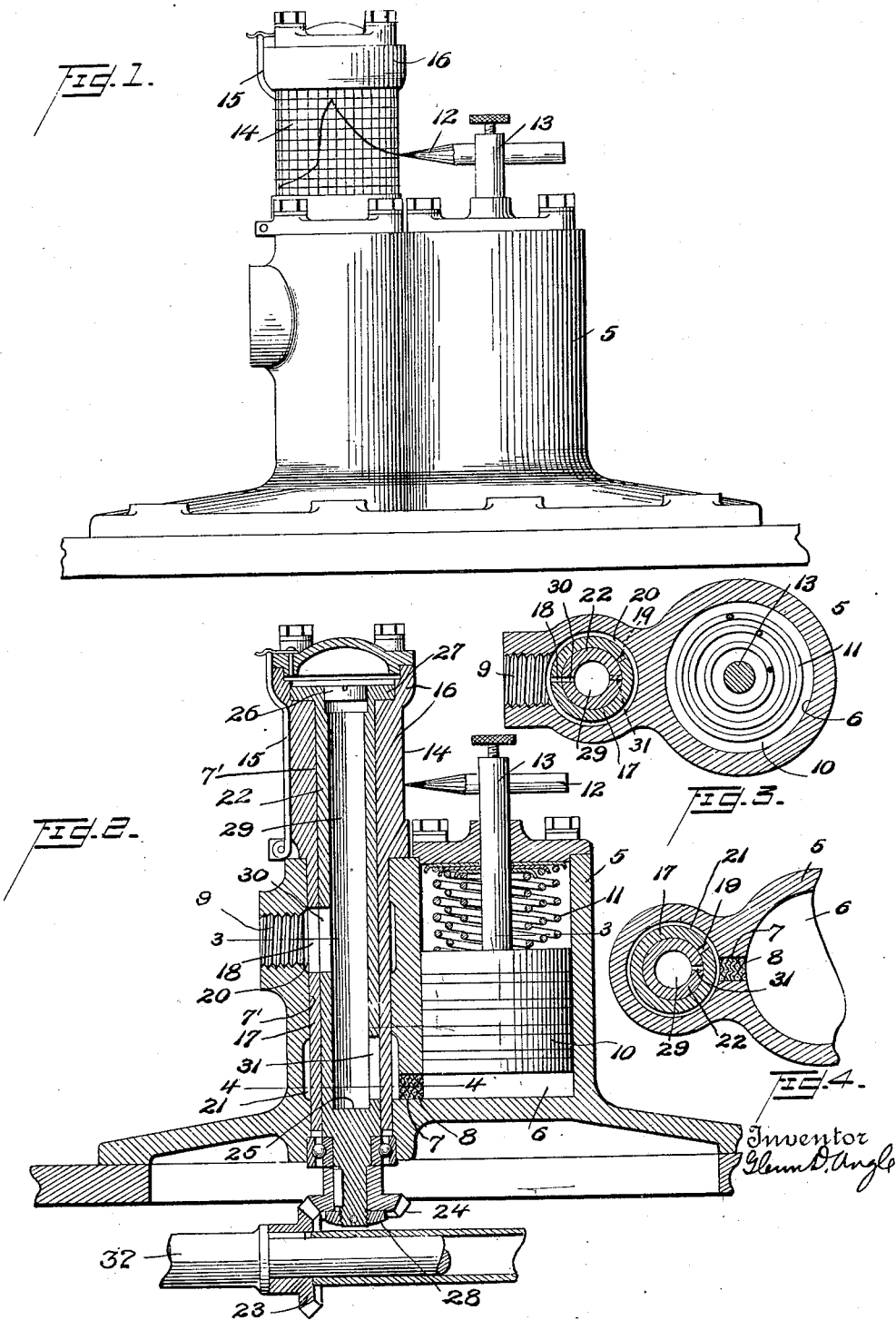

1,720,710

UNITED STATES PATENT OFFICE.

GLENN D. ANGLE, OF DAYTON, OHIO.

METHOD AND APPARATUS FOR OBTAINING INDICATOR CARDS FROM ENGINES.

Application filed February 19, 1920. Serial No. 359,815.

The present invention relates to method and apparatus for obtaining indicator cards from engines or containers for elements under positive or negative pressure and consists in the combinations and arrangements of elements and steps hereinafter described and particularly set forth in the accompanying claims.

The invention has for a purpose to provide an apparatus whereby the average constant or mean pressure of varying pressures, or of any series of fluctuating pressures in any machine or device in which there is pressure, or in which there are varying, or fluctuating pressures, may be obtained.

The objects more particularly include means whereby the average or mean pressure of any cyclic series of pressures may be obtained.

The objects further include means whereby the average or mean pressure or pressures of any cyclic series of fluctuating pressures may be recorded for any point in the cycle.

Another object is to provide a method and means for accurately obtaining and recording the pressure within an enclosure.

Another object is to provide means for accurately recording the pressures within the cylinder or cylinders of an engine at any point in the cycle thereof, while the engine is running at any given speed. To this end it is contemplated to devise means whereby pressures at any selective point or points on the cycle may be obtained irrespective of and excluding all other points at that particular instant, or at those particular instants, respectively.

Various devices have been heretofore proposed with such purposes in view but they have been found to be generally at fault in that there is usually an error due to the inertia of reciprocating parts employed to show variations in pressures during the cycle, and in most instances the records obtained were effected by the inertia of the reciprocating parts and therefore did not give any correct pressures.

To overcome these disadvantages it is proposed to employ an apparatus having no oscillating parts operating at engine speed thus avoiding any inertia forces to be overcome and thereby the indicator responsive means for any given cycle will not oscillate and will register a sharp line on any recording device. The inertia of reciprocating or oscillating parts usually registers through the indicator mechanism widely varying oscillations on the graph, which in fact is a wide line of no accurate mean characteristic. It is further proposed to provide an instrument that may be easily calibrated to the end that any recorded error may be corrected and therefore will be of minor consequence.

The invention is shown by way of illustration in the accompanying drawing of one embodiment of my invention, as applied to an internal combustion engine, wherein:—

Figure 1 is a side elevational view thereof;

Figure 2, a central sectional view of the same;

Figure 3, a horizontal sectional view on line 3—3 of Figure 2; and

Figure 4, a similar view taken on line 4—4 of Figure 2.

Referring to the construction in further detail and wherein like reference characters indicate corresponding parts in the different views shown, the apparatus consists of a portion 5 adapted to be suitably mounted and secured upon, or immediately adjacent, the engine whose cylinders are to be tested. Said portion 5 provides a pressure chamber 6 and a passage-way 7 communicating therewith through a screen or gauze protected port 8 for establishing communication with the cylinders of the engine by a suitable pipe connected to the port 9.

A piston 10 operates within the chamber 6 under the pressure generated in the engine cylinder and against the several springs 11, and a pencil or other scribing device 12 is secured to the piston rod 13 for recording on the indicator card 14 that is suitably attached by the spring clip or other device 15 on the rotatable head 16 as shown.

The rotatable head 16 has a tubular part, sleeve or extension 17 journaled within the bearing and passage-way provided by the bore 7' in part 5 and said sleeve is formed with a pair of relatively narrow ports 18 and 19 which are substantially out of direct diametral line with one another and have constant communication with the annular chambers 20 and 21 that open into the intake and discharge ports 9 and 8 respectively (see Figures 3 and 4).

A hollow shaft 22 extends through the head and sleeve (16 and 17) and is connected at its lower end through mitre gearing 24, 23 to be rotatively driven by any suitable transmission such as cam shaft 32, below, at or above cam shaft speed. At its upper end the shaft 22 may be temporarily, as by screw plug 26, or permanently closed in a gas-tight manner and is provided with a flange to afford security within the head 16. Suitable means may be provided to prevent up and down movement of the shaft 22 while in operation and the gear 24 is held on the shaft 22 by a nut 28. The passage-way or chamber 29 communicates with ports 18, 19 through ports 30, 31 (see Figures 3 and 4) of the same size and thereby provides communication between the pressure chamber 6 and the pressures to be tested. The volume of the chamber 29 may be made small in comparison to the volume of chamber 6, whereas the indicator card will be calibrated to correct for other errors incident to use of indicator mechanism generally, such as speed of operation. Each joint 7' is made practically gastight and is impregnated with graphite to maintain a seal as well as for lubrication.

For convenience we may consider port 9 in closed communication with an engine cylinder, consequently any pressure in annular chamber 20 is substantially that in the engine cylinder. Should it be desired to obtain the pressure value at a point in the cycle the indicator may be geared to the cam shaft to rotate at the proper speed (in the case of a four-cycle engine at half engine or cam shaft speed) so that one revolution of the sleeve 22 takes place during each cycle and the ports 18 and 30, 19 and 31 register once during each cycle. The head and sleeve 17 may be rotated by hand or otherwise to any position and will be retained in that position (by means not shown) or by friction, to determine relatively to the cycle, any point at which the value of the pressure is desired. Thus it follows that at any one particular point in the cycle the pressure will be indicated.

To minimize fluctuations of pressure in chambers 29 and 6 and consequently oscillations of the scribing means, this mechanism has been devised whereby to cut off or trap a gas or vapor under any instantaneous pressure and transmit that pressure indirectly to the scribing mechanism. To this end also, the ports 18 and 19 are arranged in staggered relation, that is, they are not diametrically opposite one another across the sleeve 17, but are placed less than 180° apart, as shown in Figure 4.

In operation an instantaneous pressure will be set up in chamber 29 and that pressure will be the pressure in the engine cylinder at a point in the cycle dependent upon the relation of the point of juxtaposition of the ports 18, 30 with the cycle. As the sleeve 22 rotates the pressure will be trapped in chamber 29 until the port 31 registers with the port 19, whereupon the pressure is transmitted to the chamber 6. Upon each successive registration of the ports 18, 30 and relatively later registration of ports 31, 19, at a particular point in the cycle, a mean pressure will be gradually built up in chamber 6 for that point in the cycle which pressure will be indicated on the graph a minimum of fluctuation or oscillation.

It will be seen that the indicator has utility for measuring and testing the efficiency of manifolds, intake or exhaust, by measuring the cyclic fluctuations of pressure of either the intake or exhaust.

It is obvious that those skilled in the art may vary the details of construction and arrangement of parts without departing from the spirit of the invention, and it is therefore understood that the structure is not limited to such features except as may be required by the claims.

What is claimed as new is:

1. A pressure indicator mechanism comprising in combination a periodic fluid trapping device including a valve having inlet and outlet ports which are opened and closed successively, one port being closed when the other is open, and means adjacent and in communication with said trapping device for indicating the pressure of said fluid.

2. A pressure indicator apparatus comprising in combination, a periodic pressure trapping means including a valve having inlet and outlet ports which are opened and closed successively, one port being closed when the other is open, means adjacent said trapping means for indicating pressure and means for establishing communication between said trapping and adjacent means.

3. An apparatus for indicating a mean periodic fluid pressure, which comprises indicating mechanism and means including a valve having inlet and outlet ports which are opened and closed successively, one port being closed when the other is open, for instantaneously trapping a fluid at instantaneous pressure and for thereafter admitting the fluid to the indicator mechanism.

4. In a mechanism for indicating fluid pressures, in combination, means for indicating pressure, means including a valve for trapping a fluid at any instant, said valve having an outlet port movable to operate said fluid trapping means, whereby the fluid is trapped and its pressure indicated successively.

5. In a pressure indicating mechanism, means including a valve having inlet and outlet ports which are opened and closed successively, one port being closed when the other is open, for trapping a fluid at an instantaneous pressure of a cyclic series of fluid pressures recurrently in cyclic succession and means adjacent said trapping means for recording the instantaneous fluid pressures.

6. In a pressure indicating device, in combination, means for obtaining an average characteristic pressure of a cyclic series of pressures comprising fluid trapping means including a valve having inlet and outlet ports which are opened and closed successively, one port being closed when the other is open, means to operate said trapping means in a predetermined recurrent series and pressure indicating means.

7. In an apparatus for taking indicator cards from engines, the combination of means for holding the indicator card, a cylinder providing a fluid receiving chamber having periodic communication with the cylinder of the engine, a piston operable in said chamber, rotary fluid trapping means including a valve having inlet and outlet ports which are opened and closed successively, one port being closed when the other is open, for effecting and determining the periods of such communication, and an indicating device carried by the piston, substantially as described.

8. In an apparatus for taking pressure indicator cards the combination of means for holding said cards, a fluid receiving chamber, mechanism therein responsive to pressure changes in said fluid for indicating on a card, a second fluid receiving chamber communicating with said first chamber, valve means for introducing fluid to said second chamber and means connected with said second chamber for periodically establishing communication with said first chamber when said valve means is closed.

9. In an apparatus for taking indicator cards from engines the combination of means for holding the indicator card, a cylinder providing a fluid receiving chamber having a port for external communication, fluid pressure responsive indicator means in said chamber, a revoluble sleeve and a substantially stationary sleeve in conjunction with one another having ports registerable to establish communication periodically with one another and with said first mentioned port and means whereby said sleeves may communicate with a fluid pressure generating portion of the engine.

10. In an apparatus for taking indicator cards from engines the combination of a rotatable part for holding the indicator card, said part having a cylindrical sleeve, a revoluble sleeve therein, each of said sleeves having ports, a cylinder providing a fluid receiving chamber having a port for communicating with the revoluble sleeve and having pressure responsive means therein, transmission for rotating said revoluble sleeve from the engine for periodically registering one of the ports of each of the sleeves with the port of the fluid receiving chamber, and a scribing device carried by the pressure responsive means, substantially as set forth.

11. In an apparatus for taking indicator cards from engines the combination of a rotatable part for holding the indicator card, said part having ports therein, a cylinder providing a fluid receiving chamber having a port for communication with the engine cylinder and having a piston therein, a hollow shaft mounted in and revoluble in said rotatable part, said shaft having ports disposed in relatively angular relation and operable to establish periodic communication between the engine cylinder and the fluid receiving chamber through said part and shaft, and a scribing device carried by the piston, substantially as set forth.

12. In an apparatus for taking indicator cards from engines, the combination of a portion providing a fluid receiving chamber and a passage-way communicating therewith, a piston operable in said fluid receiving chamber, a hollow member rotatably mounted in said passage-way and adapted for holding the indicator card, said rotatable member having ports providing for communication between the engine cylinder and the fluid receiving chamber at selective points in the engine cycle, a hollow shaft mounted in said rotatable member and connected to be driven from the engine, said shaft having ports co-operable with the ports of said hollow member for establishing periodic communication between the engine cylinder and the pressure chamber and forming a bearing, a piston operable in said pressure chamber, and a scribing device carried by the piston, substantially as set forth.

13. In an apparatus for taking indicator cards from engines the combination of a portion providing a fluid receiving chamber and a passage forming communication between the engine cylinder and said fluid receiving chamber, a head having a sleeve portion journaled in said bearing and adapted for holding the indicator card, said sleeve portion having ports providing communication between the engine cylinder and fluid chamber at selective points in the engine cycle, a hollow shaft fitting in said head and sleeve portion and connected to be operated from the engine, said hollow shaft having ports for registering respectively with the ports of said sleeve to establish communication between the engine cylinder and fluid chamber, and a scribing device carried by the piston, substantially as set forth.

14. In an apparatus for taking indicator cards from engines the combination of a portion providing a fluid receiving chamber and a passage-way communicating therewith providing a bearing, a piston operable in said fluid chamber, a rotatable head having a sleeve journaled in said bearing and adapted for holding the indicator card, said sleeve having ports providing communication between the engine cylinder and said fluid chamber at selective periods in the engine cycle, a hollow shaft mounted in said head and sleeve portion for rotation within the same and connected to be operated from the engine, said hollow shaft having ports for registering respectively with the ports of said sleeve portion for timing the communication between the engine cylinder and fluid chamber, and a scribing device carried by the piston, substantially as set forth.

15. A pressure indicator mechanism for an engine comprising a pressure responsive device movable in response to pressure variation, a fluid trap having an aperture adapted to communicate directly with the engine cylinder and a second aperture adapted to communicate directly with the said pressure responsive device, and means for opening and closing the first aperture and for thereafter opening and closing the second aperture.

16. A pressure indicator mechanism for an engine comprising a pressure responsive device movable in response to pressure variation, and a fluid trap adapted to be brought into communication successively with the engine cylinder and with the pressure responsive device for sealing a quantity of fluid at cylinder pressure within itself and thereafter releasing such sealed fluid to the pressure responsive device.

17. A pressure indicator mechanism for an engine comprising means for movably carrying an indicator card, a fluid trap adapted to be brought successively into communication with the engine cylinder and with the pressure responsive device, for sealing a quantity of fluid at cylinder pressure within itself and for thereafter releasing such sealed fluid to the pressure responsive device, and means, controlled by the movements of the engine, for controlling the operation of the indicator card carrying means and of the fluid trap.

In testimony whereof I affix my signature.

GLENN D. ANGLE.